US010006404B2

(12) United States Patent
Malecki

(10) Patent No.: US 10,006,404 B2
(45) Date of Patent: Jun. 26, 2018

(54) GAS TURBINE ENGINE THRUST REVERSER SYSTEM

(75) Inventor: Robert E. Malecki, Storrs, CT (US)

(73) Assignee: United Technologies Corporation, Farmington, CT (US)

( * ) Notice: Subject to any disclaimer, the term of this patent is extended or adjusted under 35 U.S.C. 154(b) by 1837 days.

(21) Appl. No.: 13/406,924

(22) Filed: Feb. 28, 2012

(65) Prior Publication Data

US 2013/0221124 A1   Aug. 29, 2013

(51) Int. Cl.
*F02K 1/72* (2006.01)

(52) U.S. Cl.
CPC ..................... *F02K 1/72* (2013.01)

(58) Field of Classification Search
CPC ... F02K 1/72; F02K 1/74; F02K 1/766; F02K 1/60; F02K 1/70; F02K 1/625
USPC ............ 239/265.23, 265.33, 265.37, 265.39, 239/265.41
See application file for complete search history.

(56) References Cited

U.S. PATENT DOCUMENTS

| 3,500,644 | A |   | 3/1970 | Hom et al. |
| 3,568,930 | A |   | 3/1971 | Kuchar |
| 4,183,478 | A | * | 1/1980 | Rudolph ............... 244/110 B |
| 4,216,923 | A | * | 8/1980 | Harris .................. 244/110 B |
| 4,356,973 | A |   | 11/1982 | Lawson |
| 4,373,328 | A |   | 2/1983 | Jones |
| 4,527,391 | A |   | 7/1985 | Marx et al. |
| 5,228,641 | A |   | 7/1993 | Remlaoui |
| 5,575,147 | A |   | 11/1996 | Nikkanen |
| 5,655,360 | A |   | 8/1997 | Butler |
| 5,853,148 | A |   | 12/1998 | Standish et al. |
| 5,987,880 | A |   | 11/1999 | Culbertson |
| 6,170,254 | B1 |   | 1/2001 | Cariola |
| 6,434,927 | B1 |   | 8/2002 | Stretton |
| 7,484,355 | B2 |   | 2/2009 | Blin et al. |
| 8,006,479 | B2 |   | 8/2011 | Stern |
| 2001/0010148 | A1 | * | 8/2001 | Michel et al. ............... 60/226.1 |
| 2009/0107108 | A1 | * | 4/2009 | Vauchel ................... F02K 1/70 60/226.2 |

FOREIGN PATENT DOCUMENTS

| WO | 9619656 A1 | 6/1996 |
| WO | 2008045056 A1 | 4/2008 |

OTHER PUBLICATIONS

Static Performance of Six Innovative Thrust Reverser Concepts for Subsonic Transport Applications, Scott C. Asbury and Jeffrey A. Yetter, NASA/TM-2000-210300, Jul. 2000.
International Search Report and Written Opinion for International Patent Application Na PCT/US2013/02653 completed May 30, 2013.
International Preliminary Report on Patentability for PCT Application No. PCT/US2013/026536.

* cited by examiner

*Primary Examiner* — Pascal M Bui Pho
*Assistant Examiner* — Stefan Ibroni
(74) *Attorney, Agent, or Firm* — Carlson, Gaskey & Olds, P.C.

(57) ABSTRACT

An example thrust reverser blocker door includes a blocker door that is movable from a stowed position to a deployed position. Flow moves through an area of a bypass flowpath when the blocker door is in the stowed position. The blocker door blocks no less than about 70% and no more than about 85% of flow through this area when the blocker door is in the deployed position, wherein the area does not extend circumferentially past the blocker door.

20 Claims, 3 Drawing Sheets

GAS TURBINE ENGINE THRUST REVERSER SYSTEM

BACKGROUND

This disclosure relates generally to a gas turbine engine thrust reverser system and, more particularly, to optimizing an axial length of a thrust reverser cascade.

Gas turbine engines typically include a fan section, a turbine section, a compressor section, and a combustor section. Gas turbine engines may employ a geared architecture connecting the fan section and the turbine section. Air moves into the gas turbine engine through the fan section. Some of this air moves into a core of the gas turbine engine. The remaining portion of the air moves through a bypass flowpath established between the core and a nacelle.

Within the core, airfoil arrays in the compressor section rotate to compress air. The compressed air is then mixed with fuel and combusted in the combustor section. The products of combustion are expanded to rotatably drive airfoil arrays in the turbine section. Rotating the airfoil arrays in the turbine section drives rotation of the fan and compressor sections.

Flow moving through the bypass flowpath exits the bypass flowpath at a flowpath exhaust. Flow through the bypass flowpath generates thrust.

Thrust reverser systems within gas turbine engines typically include a blocker door that is deployed to redirect flow from the bypass flowpath through cascades within the nacelle. The redirected flow generates reverse thrust to slow forward movement of the gas turbine engine, in some examples, an airplane. Thrust reverser systems maintain an effective area of flow moving from the bypass flowpath when the blocker door is stowed and when the blocker door is deployed. Operation of the fan section may become disturbed if deploying the blocker door changes the effective area.

SUMMARY

A thrust reverser blocker door according to an exemplary aspect of the present disclosure includes, among other things, a blocker door moveable from a stowed position to a deployed position. Flow moves through an area of a bypass flowpath when the blocker door is in the stowed position, and the blocker door blocks no less than about 70% and no more than about 85% of flow through this area when the blocker door is in the deployed position. The area does not extend circumferentially past the blocker door.

In a further non-limiting embodiment of the foregoing thrust reverser blocker door, flow that is blocked by the blocker door may move through cascades.

In a further non-limiting embodiment of either of the foregoing thrust reverser blocker doors, the cascades may be within an outer nacelle that provides the bypass flowpath with a core engine of the gas turbine engine.

In a further non-limiting embodiment of any of the foregoing thrust reverser blocker doors, the cascades may have a forward turning angle that is between about 35 degrees to about 45 degrees relative to a plane normal to the engine center longitudinal axis.

In a further non-limiting embodiment of any of the foregoing thrust reverser blocker doors, the blocker door may extend circumferentially relative to a rotational axis of the gas turbine engine a first distance, and the area may extend circumferentially a second distance that is about the same as the first distance.

In a further non-limiting embodiment of any of the foregoing thrust reverser blocker doors, flow that is not blocked by the blocker door may exit through an aftmost region of the bypass flowpath.

In a further non-limiting embodiment of any of the foregoing thrust reverser blocker doors, the blocker door may be part of a thrust reverser system, and an effective area of the thrust reverser system when the blocker door is deployed is no less than the effective area of the thrust reversing system when the blocker door is stowed.

In a further non-limiting embodiment of any of the foregoing thrust reverser blocker doors, all the flow that is not blocked by the blocker door may move through a gap between the blocker door and a core of a gas turbine engine.

A gas turbine engine thrust reverser system according to another exemplary aspect of the present disclosure includes, among other things, a nacelle that establishes a radially outer boundary of a flowpath, a core engine that establishes a radially inner boundary of the flowpath, and an array of blocker doors moveable from a deployed position to a stowed position, the array of blocker door in the deployed position blocking more flow through the flowpath than the blocker door in the stowed position. The blocker doors in the deployed position permit no less than about 15% to no more than about 30% of flow through the flowpath that the blocker doors in the stowed position permit.

In a further non-limiting embodiment of the foregoing gas turbine engine thrust reverser system, flow that is blocked by the blocker doors may move through cascades within the nacelle.

In a further non-limiting embodiment of either of the foregoing gas turbine engine thrust reverser systems, the cascades may have a forward turning angle that is between about 35 degrees to about 45 degrees relative to a plane normal to the engine center longitudinal axis.

In a further non-limiting embodiment of any of the foregoing gas turbine engine thrust reverser systems, flow through the flowpath that is permitted by the blocker door may exit the flowpath through a flowpath exhaust at least partially provided by a trailing edge of the nacelle.

In a further non-limiting embodiment of any of the foregoing gas turbine engine thrust reverser systems, an effective area of the thrust reversing system when the blocker door is deployed is no less than the as an effective area of the thrust reverser system when the blocker door is stowed.

A gas turbine engine thrust reversing method according to another exemplary aspect of the present disclosure includes, among other things, redirecting no less than about 70% and no more than about 85% of flow from a bypass flowpath through a cascade arrangement, and moving the remaining flow through a bypass flowpath exhaust.

In a further non-limiting embodiment of the foregoing method, the cascade arrangement may have a forward turning angle that is between about 35 degrees to about 45 degrees relative to a plane normal to the engine center longitudinal axis.

In a further non-limiting embodiment of either of the foregoing methods, the blocker doors in a deployed position may redirect flow from the bypass flowpath.

In a further non-limiting embodiment of any of the foregoing methods, all the remaining flow may move through a gap between the blocker door and a core of the engine.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
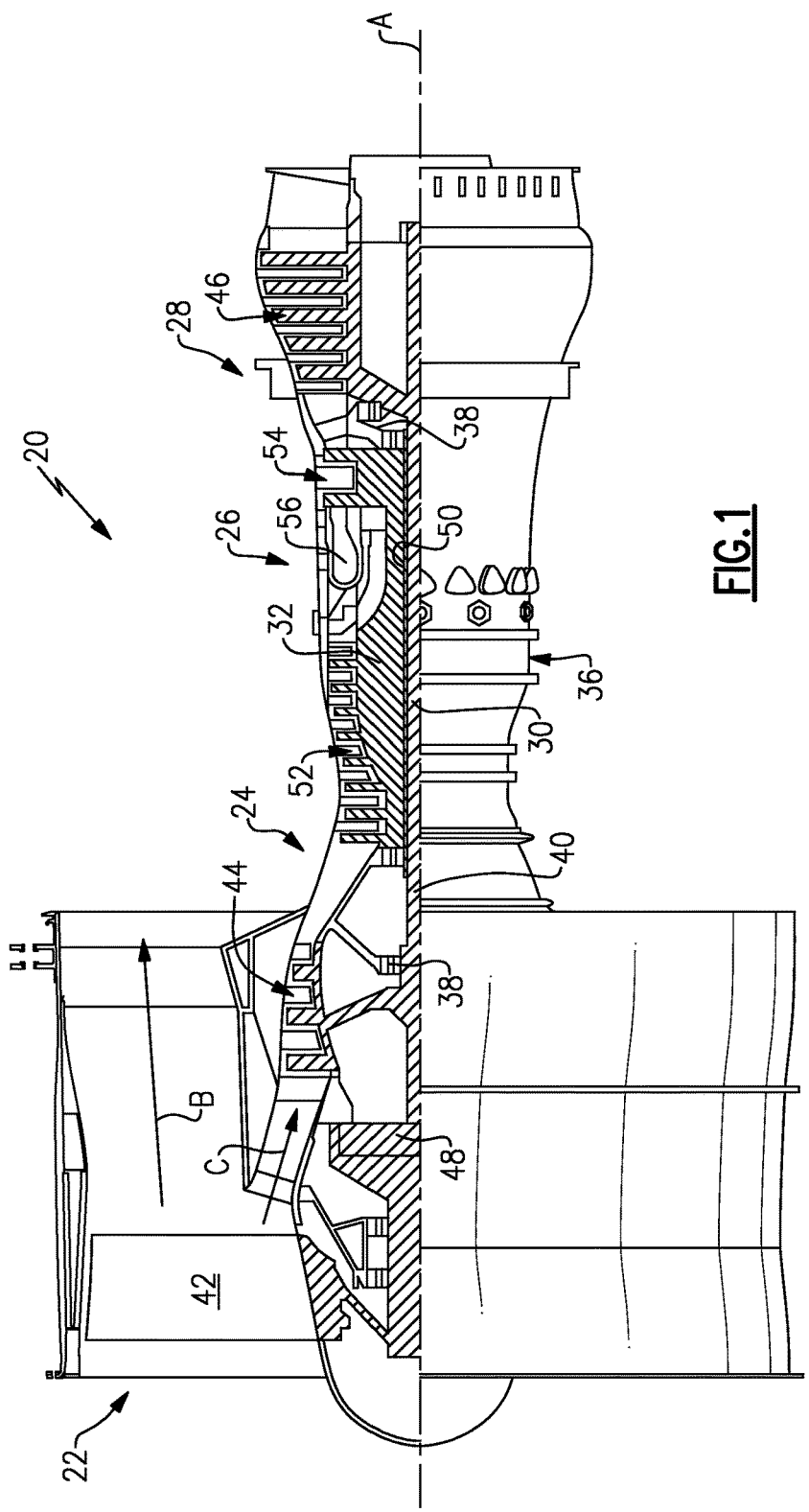
FIG. 1 shows a highly schematic view of an example gas turbine engine.
Figure 2:
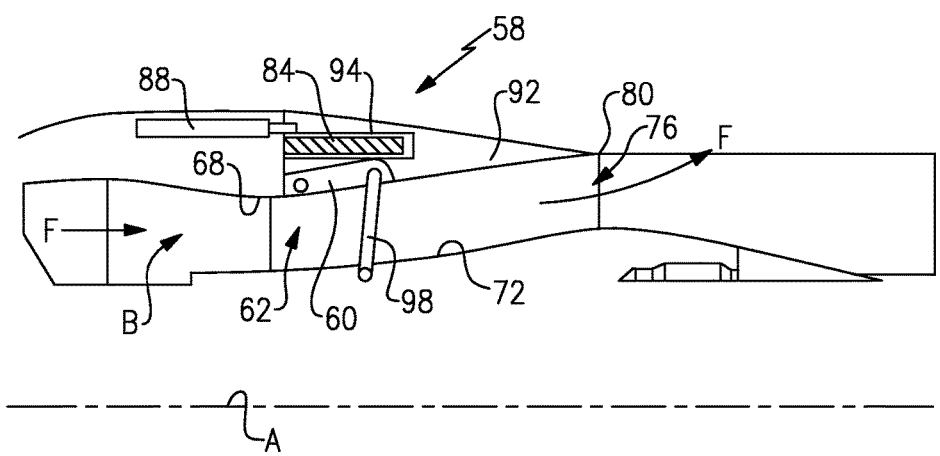
FIG. 2 shows a schematic cross-sectional view of a bypass flowpath within the FIG. 1 engine with a blocker door in a stowed position.
Figure 3:
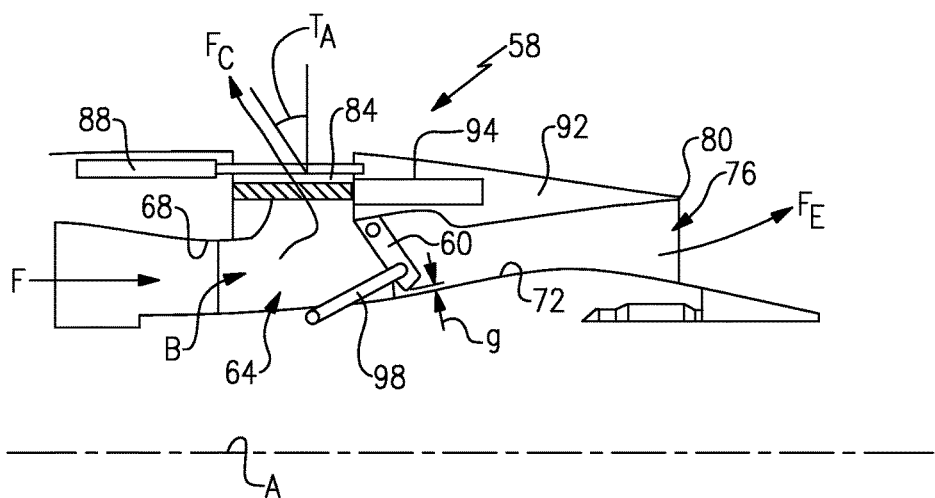
FIG. 3 shows a schematic cross-sectional view of a bypass flowpath within the FIG. 1 engine with a blocker door in a deployed position.
Figure 4:
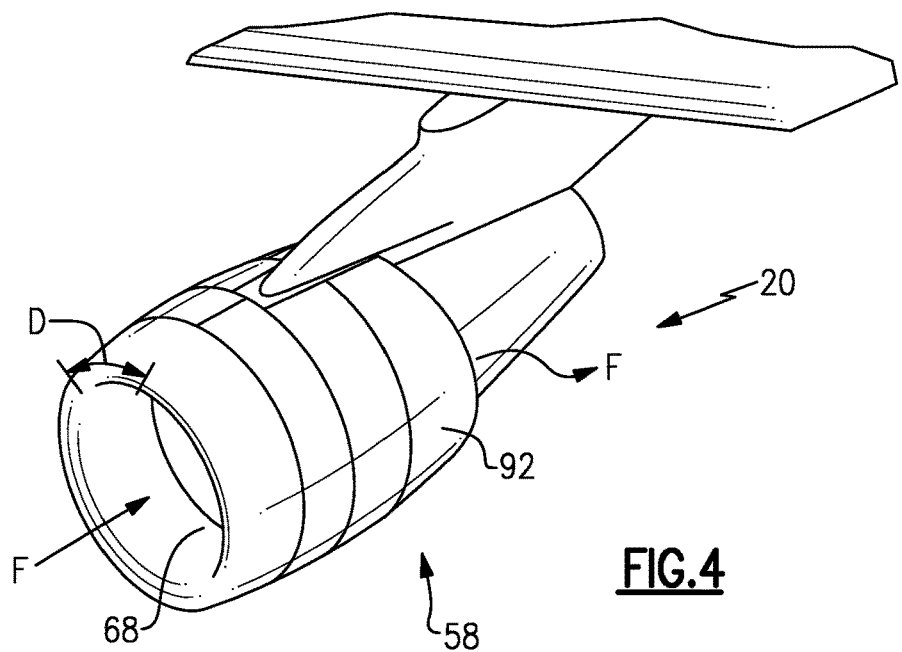
FIG. 4 shows a perspective view of the FIG. 1 engine with a blocker door in a stowed position.
Figure 5:
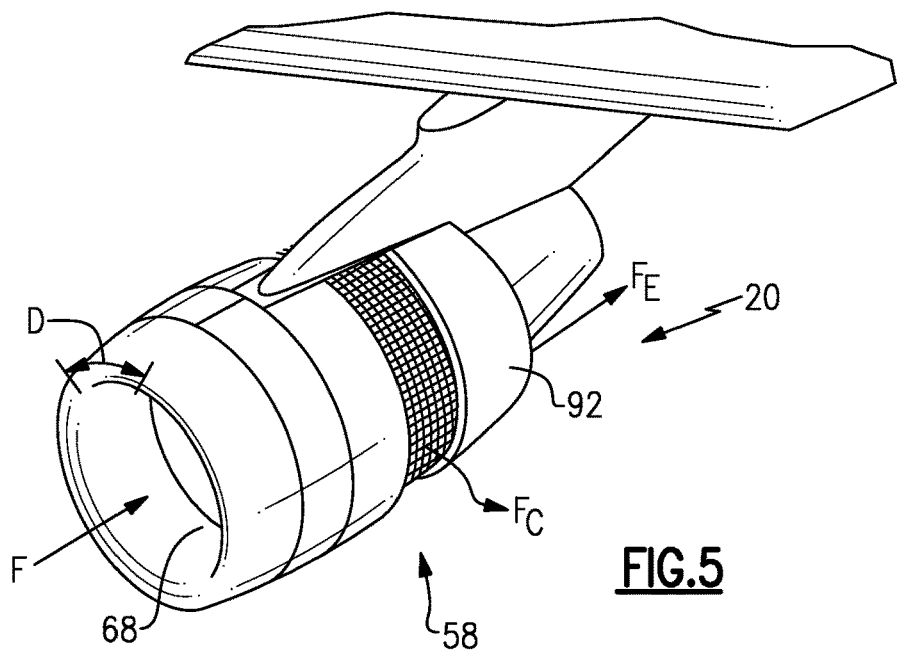
FIG. 5 shows a perspective view of the FIG. 1 engine with a blocker door in a deployed position.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

In the example engine 20, flow moves from the fan section 22 to a bypass flowpath B or a core flowpath C. Flow from the bypass flowpath B generates forward thrust. The compressor section 24 drives air along the core flowpath C. Compressed air from the compressor section 24 communicates through the combustion section 26. The products of combustion expand through the turbine section 28.

The example engine 20 generally includes a low-speed spool 30 and a high-speed spool 32 mounted for rotation about an engine central longitudinal axis A relative to an engine static structure 36. The low-speed spool 30 and the high-speed spool 32 are rotatably supported by several bearing systems 38. It should be understood that various bearing systems 38 at various locations may alternatively, or additionally, be provided.

The low-speed spool 30 generally includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30.

The high-speed spool 32 includes an outer shaft 50 that interconnects a high-pressure compressor 52 and high-pressure turbine 54.

The inner shaft 40 and the outer shaft 50 are concentric and rotate via bearing systems 38 about the engine central longitudinal axis A, which is collinear with the longitudinal axes of the inner shaft 40 and the outer shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by 518.7^0.5. The Temperature represents the ambient temperature in degrees Rankine. The Low Corrected Fan Tip Speed according to one non-limiting embodiment of the example engine 20 is less than about 1150 fps (351 m/s).

Referring now to FIGS. 2 to 5 with continuing reference to FIG. 1, an example gas turbine engine thrust reverser system 58 includes a thrust reverser blocker door 60 movable from a stowed position 62 to a deployed position 64.

The blocker door 60 is one of several blocker doors annularly distributed about the axis A. The blocker door 60 extends circumferentially a distance D, and an area of the bypass flowpath B blocked by the blocker door 60 extends circumferentially about the same distance. The example area of the bypass flowpath B does not extend circumferentially past the blocker door 60.

When the blocker door 60 is in the deployed position 64, the blocker door 60 blocks a portion of a flowpath B established between a nacelle 68 and a core engine 72. The nacelle 68 establishes a radially outer boundary of the flowpath B. The core engine 72 establishes a radially inner boundary of the flowpath B.

The blocker door 60, in this example, is moved between the stowed position 62 and the deployed position 64 using an axially extending actuator 88. In operation, the actuator 88 moves an aftmost cowl 92 of the nacelle 68 axially rearward relative to other portions of the nacelle 68. Moving the aftmost cowl 92 reveals and opens the cascades 84. The aftmost cowl 92 includes a pocket 94 that receives the cascades 84 when the blocker door 60 is in the stowed position 62.

An arm 98 holds the blocker door 60 when the actuator 88 is actuated. The arm 98 causes the blocker door 60 to move to the deployed position 64. The actuator 88 retracts axially to return the blocker door 60 from the deployed position 64 to the stowed position 62.

When the blocker door 60 is in the stowed position 62, flow F moves through the flowpath B, and all the flow F exits the flowpath B through a flowpath exhaust 76. A trailing edge 80 of the nacelle 68 (which is the aftmost portion of the nacelle 68) establishes the outer boundary of the flowpath exhaust 76. The flowpath exhaust 76 is at an aftmost region of the bypass flowpath B.

When the blocker door 60 is in the deployed position 64, some of the flow $F_E$ continues to move through the flowpath exhaust 76, and the remaining portion of the flow $F_C$ is directed through cascades 84 provided by the nacelle 68. Flow $F_C$ moving through the cascades 84 plus the flow $F_E$ moving through the flowpath exhaust 76 is, in this example, approximately the same as the amount of flow F moving through the flowpath exhaust 76 when the blocker door 60 is in the stowed position 62.

In this example, the flow $F_C$ is about 70% to 85% of the flow F entering the engine 20. The remaining portions of the flow F moves through the flowpath exhaust 76.

In another example, the flow FE is about 15% to 30% of the flow F entering the engine 20. That is about 15% to 30% of the flow F moves past the blocker door 60 through the flowpath exhaust 76, The remaining portion of the flow F moves through the cascades 84 as the flow FC. The cascades 84, in this example, have a forward turning angle $T_A$ that is between about 35 degrees and about 45 degrees relative to a plane normal to the axis A.

The example blocker door 60 does not include apertures or perforations for communicating fluid. Thus flow $F_E$ moving through the flowpath exhaust 76 when the blocker door 60 is in the deployed position 64 is flow that has moved around an outer perimeter of the blocker door 60. In this example, the flow $F_E$ moves through a gap g between the blocker door 60 and the core engine 72. That is, flow moves around the blocker door 60 and does not move through the blocker door 60.

In another example, the blocker door 60 includes apertures or perforations that permit flow to move at least some flow through the blocker door 60 and exit at the flowpath exhaust $F_E$.

In this example, the force required to stop the engine and airplane is described according to a Formula (1).

$$F_{net, rev} = C_{V,rev} F_{g, fan} - F_{g, pri} + F_{ram} - F_{g, leak}$$  Formula (1):

In the above example, the primary gross thrust of the engine 20 is represented by $F_{g, pri}$. The ram drag associated with the engine 20, and particularly the fan section 22, is represented by $F_{ram}$. $F_{g, leak}$ represents the gross thrust of the flow $F_E$ moving past the blocker door 60 to the flowpath exhaust 76. The gross thrust of the bypass duct is represented by $F_{g, fan}$, and $C_{V,rev}$ represents the aerodynamic reverse thrust efficiency of the cascades 84.

The example engine 20 has a larger diameter than prior art engines. The geared architecture 48 facilitates this larger diameter design. The example engine 20 with the larger diameter design has more ram drag than the prior art engines. This increased ram drag facilitates providing a required thrust reversing force from the thrust reversing system 58. Thus, the remainder of the thrust reversing system 58 is required to provide less thrust reversing force. In principle, this would allow the thrust cascades 84 to be shortened. However, when the thrust reverser blocker door 60 is in a deployed position 64, the effective area of the thrust reversing system 58 is typically no less than the effective area of the thrust reversing system 58 when the thrust reverser blocker door 60 is stowed. Providing more leakage past the blocker door 60 through the flowpath exhaust 76 when the blocker door 60 is in a deployed position 64 increases the effective area of the thrust reversing system 58, and thus allows the axial length of the cascade 84 to be axially shortened while maintaining the required effective area of the reverser system 58.

Features of the disclosed examples include a cascade that is shortened relative to the size of the engine versus prior art designs. The shorter cascade utilizes less material and reduces weight. The resulting shorter thrust reversing system 58 also reduces aerodynamics drag within the bypass flowpath B and on the external aft surface of the nacelle 68.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:
1. A thrust reverser blocker door, comprising:
   a blocker door moveable from a stowed position to a deployed position, wherein flow moves through an area of a bypass flowpath when the blocker door is in the stowed position, and the blocker door blocks between no less than 70% and no more than 85% of flow through this area when the blocker door is in the deployed position, wherein the area does not extend circumferentially past the blocker door.
2. The thrust reverser blocker door of claim 1, where substantially all flow that is blocked by the blocker door moves through cascades.
3. The thrust reverser blocker door of claim 2, wherein the cascades are within an outer nacelle that provides the bypass flowpath with a core engine of a gas turbine engine.
4. The thrust reverser blocker door of claim 2, wherein the cascades have a forward turning angle that is between 35 degrees and 45 degrees relative to a plane normal to an engine center longitudinal axis.
5. The thrust reverser blocker door of claim 1, wherein the blocker door extends circumferentially relative to a rotational axis of a gas turbine engine a first distance, and the area extends circumferentially a second distance that is about the same as the first distance.
6. The thrust reverser blocker door of claim 1, wherein flow that is not blocked by the blocker door exits through an aftmost region of the bypass flowpath.
7. The thrust reverser blocker door of claim 1, wherein the blocker door is part of a thrust reverser system, and an effective area of the thrust reverser system when the blocker door is deployed is no less than the effective area of the thrust reversing system when the blocker door is stowed, wherein the effective area is a mean exit area of a flowpath exhaust.
8. The thrust reverser blocker door of claim 1, wherein all the flow that is not blocked by the blocker door moves through a gap between the blocker door and a core of a gas turbine engine.
9. A gas turbine engine thrust reverser system, comprising:
   a nacelle that establishes a radially outer boundary of a flowpath;
   a core engine that establishes a radially inner boundary of the flowpath; and an array of blocker doors moveable from a deployed position to a stowed position, the array of blocker doors in the deployed position blocking more flow through the flowpath than the blocker doors in the stowed position, wherein the blocker doors in the deployed position permit from no less than 15% to no more than 30% of flow through the flowpath that the blocker doors in the stowed position permit.

10. The gas turbine engine thrust reverser system of claim 9, where flow that is blocked by the blocker doors moves through cascades within the nacelle.

11. The gas turbine engine thrust reverser system of claim 10, wherein the cascades have a forward turning angle that is between 35 degrees and 45 degrees relative to a plane normal to the engine center longitudinal axis.

12. The gas turbine engine thrust reverser system of claim 9, wherein flow through the flowpath that is permitted by the blocker doors exits the flowpath through a flowpath exhaust at least partially provided by a trailing edge of the nacelle.

13. The gas turbine engine thrust reverser system of claim 9, wherein an effective area of the thrust reversing system when the blocker doors is deployed is no less than the effective area of the thrust reverser system when the blocker doors is stowed, wherein the effective area is a mean exit area of a flowpath exhaust.

14. A gas turbine engine thrust reversing method, comprising:

(a) redirecting no less than 70% to no more than 85% of flow from a bypass flowpath through a cascade arrangement; and (b) moving the remaining flow through a bypass flowpath exhaust.

15. The gas turbine engine thrust reversing method of claim 14, wherein the cascade arrangement has a forward turning angle that is between 35 degrees and 45 degrees relative to a plane normal to an engine center longitudinal axis.

16. The gas turbine engine thrust reversing method of claim 14, wherein blocker doors in a deployed position redirect flow from the bypass flowpath.

17. The gas turbine engine thrust reversing method of claim 14, wherein all the remaining flow moves through a gap between the blocker door and a core of an engine.

18. The thrust reverser blocker door of claim 1, wherein the blocker door is unapertured such that no flow blocked by the blocker door is moved through any aperture provided by the blocker door.

19. The gas turbine engine thrust reverser system of claim 9, wherein the blocker doors are each unapertured such that no flow through the flowpath moves through any aperture provided by the blocker doors.

20. The gas turbine engine thrust reversing method of claim 16, wherein the blocker doors are unapertured such that no flow moves through any aperture provided by the blocker doors.

* * * * *